United States Patent
Yoshimura et al.

(10) Patent No.: US 7,173,077 B2
(45) Date of Patent: Feb. 6, 2007

(54) AQUEOUS GLITTERING INK COMPOSITION

(75) Inventors: Yasuyuki Yoshimura, Ibaraki (JP);
Naoshi Murata, Higashiosaka (JP);
Yuki Yamamoto, Yamatokoriyama (JP);
Tomohiro Sawa, Osaka (JP)

(73) Assignee: Sakura Color Products Corp., Osaka (JP)

( * ) Notice: Subject to any disclaimer, the term of this patent is extended or adjusted under 35 U.S.C. 154(b) by 0 days.

(21) Appl. No.: 09/907,122

(22) Filed: Jul. 17, 2001

(65) Prior Publication Data

US 2002/0007768 A1 Jan. 24, 2002

Related U.S. Application Data

(63) Continuation of application No. 09/665,534, filed on Sep. 19, 2000, now Pat. No. 6,770,689, and a continuation of application No. 09/523,619, filed on Mar. 13, 2000, now abandoned.

(30) Foreign Application Priority Data

Jul. 17, 2000  (JP) .............................. 2000-215930

(51) Int. Cl.
*C09D 11/18* (2006.01)
*C09D 11/16* (2006.01)
*C08K 3/08* (2006.01)

(52) U.S. Cl. ....................................... 523/161; 524/441

(58) Field of Classification Search ................ 523/160, 523/161; 106/31.27, 31.6, 404, 641, 647; 524/399, 437, 441, 548, 556
See application file for complete search history.

(56) References Cited

U.S. PATENT DOCUMENTS 3,776,473 A * 12/1973 Casey et al. ................... 241/15
4,598,118 A * 7/1986 Hansen et al. ............... 524/517
5,332,457 A * 7/1994 Katoh et al. ................... 156/72
5,474,603 A * 12/1995 Miyashita et al. ........ 106/31.33
6,114,412 A * 9/2000 Kanbayashi et al. ........ 523/161
6,120,590 A * 9/2000 Miyamoto et al. ......... 106/31.6
6,171,381 B1 * 1/2001 Yoshimura et al. ......... 106/31.6
6,299,376 B1 * 10/2001 Nakatani ..................... 401/215
6,325,845 B1 * 12/2001 Kurihara et al. .......... 106/31.68

FOREIGN PATENT DOCUMENTS

JP  08151547 A  * 8/1996

OTHER PUBLICATIONS

English Translation of JP 08151547 A (1996).*

* cited by examiner

*Primary Examiner*—Callie Shosho
(74) *Attorney, Agent, or Firm*—Howard C. Miskin, Esq.; Gloria Tsui-Yip, Esq.

(57) ABSTRACT

An aqueous glittering ink composition whose viscosity ranges from about 1,000 to about 10,000 mPa·s, (measured by an ELD-type viscometer: 3° R 14 cone, 0.5 rpm, at the temperature of 20° C.) comprising
 a. aluminum powder pigments whose median diameter is not less than about 15 μm compounded with oleic acid and/or stearic acid;
 b. synthetic resin emulsions selected from acryl based synthetic resin emulsions, styrene-acryl based synthetic resin emulsions and vinyl acetate based synthetic resin emulsions;
 c. polysaccharide selected from whelan gum, succinoglycan, and rhamsan gum;
 d. water-soluble organic solvent; and
 e. colored pigment.

17 Claims, No Drawings

AQUEOUS GLITTERING INK COMPOSITION

CROSS-REFERENCE TO RELATED APPLICATIONS

The present application is a continuing application of U.S. patent application Ser. No. 09/523,619, filed Mar. 13, 2000, now abandoned and U.S. patent application Ser. No. 09/665,534, filed Sep. 19, 2000 now U.S. Pat. No. 6,770,689.

BACKGROUND OF THE INVENTION

1. Field of the Invention

The present invention relates to an aqueous glittering ink composition which can be suitably used for ball-point pens.

2. Description of the Prior Art

Heretofore, for the purpose of obtaining a written mark with metallic luster such as gold, silver, and the like, aqueous ink compositions using aluminum pigments or pearlescent pigments have been proposed. For example, Japanese Unexamined Patent Publication No. 8-151547 proposes an aqueous ink composition using aluminum powder pigments whose surface is treated with stearic acid. Japanese Unexamined Patent Publication No. 7-118592 proposes an aqueous ink composition using pearlescent pigments.

However, in the case of such conventional aqueous ink compositions using pigments such as aluminum powder pigments, pearlescent pigments, it has been difficult to obtain written marks with a strong glittering feeling.

SUMMARY OF THE INVENTION

In accordance with the present invention an aqueous glittering ink composition is provided in which the composition comprises an aluminum powder pigment whose median diameter is not less than about 15 µm compounded with oleic acid and/or stearic acid, a water-soluble resin, a compounded with oleic acid and/or stearic acid, a water-soluble resin, a water-soluble organic solvent and water.

DESCRIPTION OF THE PREFERRED EMBODIMENT

In accordance with the present invention, it has been found that in the case where aluminum powder pigments compounded with oleic acid and/or stearic acid (which exist on the surface of the particle of aluminum powder pigment), whose median diameter is not less than 15 µm, preferably from about 30 to about 60 µm are used for writing instruments including ball-point pens as an aqueous ink composition with a water-soluble resin, a water-soluble organic solvent and water contained, a strong glittering feeling appeared in the written marks of the ink.

In addition, it has been found that in the case where aluminum powder pigments ground with stearic acid as a lubricant, whose median diameter is not less than 15 µm, preferably from about 30 to about 60 µm are used for writing instruments including ball-point pens as an aqueous ink composition with a water-soluble resin, a water-soluble organic solvent, and water contained, a strong glittering feeling appeared in the written marks of the ink.

The aqueous ink composition of the present invention provides a strong glittering feeling in marks when written as writing instruments including ball-point pens.

The object of the present invention is to provide an aqueous glittering ink composition used for ball-point pens or the like which can provide written marks having a glittering feeling stronger in comparison with aqueous ink compositions using conventional aluminum powder pigments or pearlescent pigments.

(Aluminum Powder Pigments)

The aluminum powder pigments used in the present invention are obtained as the aluminum paste by, for example, compounding oleic acid or stearic acid as a lubricant (grinding assistant) with mineral spirit, for example, dispersing, and grinding with a ball mill. Or, more preferably, for example, the aluminum powder pigment can be obtained by further adding inorganic phosphoric acid, aliphatic compound, surfactant, water, hydrated alcohol and hydrocarbon oil to this aluminum paste (cake), thereafter kneading, or the like, in the mixer. Water-resistant aluminum flake paste (water-resistant aluminum powder pigment or water-resistant aluminum flake pigment composition) can also be used. In short, any aluminum powder pigments can be used as far as they are ground with oleic acid or stearic acid as a lubricant.

If the aluminum powder pigments are the ones ground with this oleic acid as a lubricant, since the adsorption of the oleic acid to the particle surface of the aluminum powder pigments is low, and the polar character is large, they become written marks or coating films of non-leafing types. Since the aluminum powder pigments are in written marks or coating films, each aluminum powder pigment exists orientating itself in various angles.

On the other hand, if the aluminum powder pigments are the ones ground with stearic acid as a lubricant instead of the said oleic acid and used likewise, since the adsorption of the stearic acid to the particle surface of the aluminum powder pigments is high, and the polar character is small, they become written marks or coating films of leafing types. In this case, since pigment particles are gathering on the surface of written marks or coating films, pigment particles of each aluminum powder orient themselves substantially aligned to written marks or coating films. However, by containing a resin (varnish) with polar character, as in the case of the said aluminum powder pigments ground with oleaic acid as a lubricant, they become written marks or coating films of leafing types. Since the aluminum powder pigments are in written marks or coating films, each aluminum powder pigment exists orientating itself in various angles. In other words, in the case of the aluminum powder pigments ground with stearic acid as a lubricant, it is important to contain such resins with high polar character or high acid value that will make the aluminum powder pigments non-leafing types. The examples of these resins include water-soluble resins such as alkyd resins, melamine resins, and the like hydroxided by conducting electrolysis (electrolytic dissociation) with basic neutralizer or by introducing hydroxyl or ether group.

In addition, it is important to use the aluminum powder pigments whose pigment particles have a median diameter of not less than about 15 µm, preferably a large particle diameter of about 30 to about 60 µm in order to show a strong glittering feeling in written marks of ball-point pens or the like. When the median diameter of the said aluminum powder pigments is less than about 15 µm, even though the aluminum powder pigments orient themselves as non-leafing types in written marks or coating films, a glittering feeling lowers as written marks of ball-point pens since the flake particles are too small. On the other hand, when the median diameter of the said aluminum powder pigments exceeds about 60 μm, it is not preferable since the ink is hard to come out of the pen tip when used as an ink for ball-point pens even though the amount to be contained of the said aluminum powder pigments or the diameter of the ball is adjusted. For information, when the particle diameter of the said aluminum powder pigments whose particle diameter is large is 30 μm or greater, a stronger glittering feeling appears in written marks.

These aluminum powder pigments include the one available from Asahi Kasei Corporation under the trade name of "AW700OR" (median diameter: 15 μm), the one available from TOYO ALUMINIUM K.K. under the trade names of "WXM7640" (median diameter: 17 μm), "WXM5422" (median diameter: 19 μm), "WXM1440" (median diameter: 30 μm), "WXM1415" (median diameter: 51 μm), and "WXM7493" (median diameter: 60 μm). These aluminum powder pigments with different median diameters can be used alone or in combinations of two or more of them.

Here, the "median diameter" used in the present invention refers to the diameter specified by D 50 value measured by a laser diffraction granulometer.

Such aluminum powder pigments whose particle diameter is large are preferably contained in about 0.01 to about 20% by weight with respect to the total amount of the ink composition. When the content of the said aluminum powder pigments is less than about 0.01% by weight with respect to the total amount of the ink composition, a glittering feeling is not enough. When the content of the said aluminum powder pigments exceeds about 20% by weight with respect to the total amount of the ink composition, the viscosity of the ink becomes so high that the fluidity lowers and so do writing characteristics. Here, in applying this as an ink for ball-point pens, the optimum amount of the aluminum powder pigment whose particle diameter is large to be contained is about 0.05 to about 10% by weight when a glittering feeling and ink outflow (the outflow of the ink between a ball and the socket which maintains the ball) are taken into account.

(Water-Soluble Resin)

As a water-soluble resin, it is important to use the water-soluble thickening resin capable of adjusting the viscosity of the ink, as well as dispersing or preventing the sedimentation of the aluminum powder pigments with large particle diameters and a colorant. Particularly, it is important to use such water-soluble resins which give pseudo-plasticity fluidity (thixotrophy characteristics) to the ink. To cite an example, microbial polysaccharides and derivatives thereof can be used. Examples include pullulan, xanthane gum, whelan gum, rhamsan gum, succinoglycan and dextran, and the like. In addition, water-soluble vegetable polysaccharides and derivatives thereof including tragacanth gum, guar gum, tara gum, locust bean gum, ghatti gum, arabinogalactan gum, arabic gum, quince seed gum, pectin, starch, psyllium seed gum, carrageenan, alginic acid, agar and the like can be cited. Further, water-soluble animal polysaccharides and derivatives thereof including gelatin, casein and albumin, and the like can be cited. Moreover, N-vinylacetamide type resins such as N-vinylacetamide resin and crosslinked N-vinylacetamide resin can be used as the thickening resin.

In the present invention, the microbial polysaccharides and derivatives thereof can specifically and preferably be used among the aforementioned water-soluble resins. Such water-soluble resins can be used either alone or in combinations of two or more of them.

The water-soluble resin is preferably contained in about 0.01 to about 40% by weight with respect to the total amount of the ink composition. When the content of the water-soluble resin is less than about 0.01% by weight with respect to the total amount of the ink composition, effect on preventing the aluminum powder pigments from sedimentaion becomes unsatisfactory. When the water-soluble resin exceeds about 40% by weight relative to the total amount of the ink composition, the viscosity of the ink becomes so high that the fluidity becomes poor. The optimum amount of the water-soluble resin to be compounded, which varies depending on its type, ranges from about 0.05 to about 20% by weight.

Here, among the said water-soluble resins, whelan gum, rhamsan gum, and succinoglycan can provide the aluminum powder pigments whose median diameter is not less than about 15 μm, preferably whose particle diameter is large of about 30 to about 60 μm with good dispersal stability in the ink as well as give good pseudo plasticity characteristics (thixotrophy characteristics) to the ink containing the aluminum powder pigments with large particle diameters.

(Water-Soluble Organic Solvent)

Water-soluble organic solvents capable of preventing both from drying at the pen tip and freezing of the ink are preferably used, which can be exemplified by glycols such as ethylene glycol, diethylene glycol, triethylene glycol, propylene glycol, polyethylene glycol, and the like, polyhydric alcohols such as glycerin, glycol ethers such as ethylene glycol monomethyl ether, diethylene glycol monomethyl ether, dipropylene glycol monomethyl ether, dipropylene glycol monopropyl ether, and the like. These organic solvents can be used alone or in combinations of two or more of them.

The content of the water-soluble organic solvent is preferably contained in about 1 to about 40% by weight with respect to the total amount of the ink composition. When the content of the water-soluble organic solvent is less than about 1% by weight with respect to the total amount of the ink composition, the pen tip becomes susceptible to dry and the ink becomes liable to freeze. When the content of the water-soluble solvent exceeds about 40% by weight with respect to the total amount of the ink composition, written marks or coating films are difficult to dry out as well as solubility of the water-soluble organic solvent is affected. The optimum content of the water-soluble organic solvent, which varies depending on its type, ranges 5 to 20% by weight.

(Colorant)

It is preferable that such a colorant should be used that does not react with the aforementioned aluminum powder pigment whose particle diameter is large to have some effect on a glittering feeling of the said aluminum powder pigments. Examples include water-soluble dyes such as acid dyes, direct dyes and basic dyes, and the like, inorganic pigments such as carbon black, organic pigments such as copper phthalocyanine pigments, threne pigments, azo pigments, quinacridon pigments, anthraquinone pigments, dioxane pigments, indigo pigments, thioindigo pigments, perinone pigments, perylene pigments, indolenone pigments, azomethine pigments, and fluorescent pigments, colored resin emulsions and the like can be mentioned. These may also be used in the form of a pigment dispersion. The present invention can use one species of pigment or can use two or more species of pigments in combinations. Moreover, the aluminum powder pigment of the present invention whose particle diameter is large can be mixed with the pearlescent pigments. Furthermore, they can be used mixed with opacifying pigments including a variety of inorganic or organic white pigments such as titanium oxide, alkylene bismelamine derivatives, plastic pigments (synthetic resin particle pigments) with opacifying power of various shapes including spherical shapes, oblate shapes and the like. The aluminum powder pigments can also be used together with the metal coated inorganic pigment.

Such a colorant need not be contained in the aqueous ink composition of the present invention. Even aqueous ink compositions containing not colorants but aluminum powder pigments can provide a high glittering feeling to written marks. The aforementioned aqueous ink compositions containing colorants, however, are extremely preferable because they can provide glittering feeling depending upon the hue or the like of the colorants contained.

Here, the colorant is preferably contained in about 0.05 to about 15% by weight with respect to the total amount of the ink composition. When the colorant is less than about 0.05% by weight with respect to the total amount of the ink composition, coloring by the colorant is difficult to be visually recognized. When the colorant exceeds about 15% by weight with respect to the total amount of the ink composition, the viscosity of the ink becomes so high that the fluidity becomes poor. The optimum amount of the colorant to be compounded, which varies depending on its type, ranges from about 1 to about 10% by weight.

(Synthetic Resin Emulsion)

As previously mentioned, the present inventors have found that in order to obtain written marks with a strong glittering feeling, the aluminum powder pigments whose particle diameter is large ground with oleic acid or stearic acid as a lubricant can preferably be used in the ink composition which contains water-soluble thickening resin, water-soluble organic solvent, and water. The use of the aluminum powder pigments whose particle diameter is large can provide written marks with a glittering feeling stronger than the aluminum powder pigments or pearlescent pigments with a small particle diameter ground with fatty acid or inorganic acid as a lubricant.

However, they have also found that although an aqueous glittering ink composition containing a water-soluble resin, particularly a water-soluble thickening resin can increase fixability of the said aluminum powder pigments whose particle diameter is large by this water-soluble thickening resin, it is difficult to fix firmly to written marks because of the large size of the said aluminum powder pigment whose particle diameter is large. Accordingly, in the case of the aqueous ink composition containing the aluminum powder pigments whose particle diameter is large, the aluminum powder pigments whose particle diameter is large are easily peeled by friction after writing and it is difficult to maintain a high glittering feeling to written marks. Therefore, durability of written marks having a glittering feeling becomes poor.

From the description mentioned above, it is an important problem to be solved to provide the aqueous glittering ink composition, particularly for writing instruments, and most suitably for ball-point pens that can improve the fixability of the said aluminum powder pigments whose particle diameter is large to the writing objects and can maintain a stronger glittering feeling to the written marks without lowering the ink characteristics or writing characteristics and even without preventing the effect of a strong glittering feeling by compounding the said aluminum powder pigments whose particle diameter is large.

It has been found that the problem can be solved by aqueous glittering ink compositions containing, as essential ingredients, aluminum powder pigments, a water-soluble thickening resin, a water-soluble organic solvent and water, further containing a binder component (fixing resin component) which fixes the aluminum powder pigments to writing objects including coated materials such as papers like writing papers and transferred materials or the like.

On the other hand, another possible option for fixing such aluminum powder pigments firmly to writing objects including coated materials, transferred materials, or the like is to use a water-soluble synthetic resin as a binder component. However, in the case of some water-soluble synthetic resins, if the contents thereof are set to be high in order to fix the aluminum powder pigments firmly, solubility of the thickening resin and dispersibility of the colorant are badly affected. Moreover, there may be cases where viscoelasticity of the ink is greatly reduced, which leads to worsening in writing characteristics. Moreover, even if fixability to writing objects including coated materials, transferred materials, or the like is shown, aqueous ink compositions should not be the ones wherein a high glittering feeling of the said aluminum powder pigments whose particle diameter is large lowers in the written marks.

It has been found that the use of a synthetic resin emulsion as a binder component for fixing the aluminum powder pigments to writing objects including coated materials, transferred materials, or the like permits improvement in fixability of the said aluminum powder pigments to writing objects including papers such as writing papers or the like without inhibiting effects of a high glittering feeling by compounding the said aluminum powder pigments whose particle diameter is large, and they have accomplished the present invention.

Accordingly, the aqueous ink composition of the present invention which contains the aluminum powder pigments is capable of improving fixability of the said aluminum powder pigments to writing objects including coated materials, transferred materials, or the like forming written marks of durability, and maintaining high glittering feeling to the writing objects including coated materials, transferred materials, or the like when it is put on writing objects including coated materials, transferred materials, or the like such as paper, metal, plastics and textile products by writing, coating, or transferring. The reason for this is that the film formability of the synthetic resin emulsion is suitable for the said aluminum powder pigments whose particle diameter is large having a large-sized flake shape and the aluminum powder pigments can be fixed firmly to writing objects including coated materials, transferred materials, or the like without inhibiting effects of a high glittering feeling by compounding the aluminum powder pigments.

Moreover, since the binder component (fixing resin component) used in the present invention is not a water-soluble synthetic resin but a synthetic resin emulsion, it does not affect properties including solubility of the water-soluble thickening resin to be compounded together, dispersibility of the colorant and viscoelasticity of the ink very much. The ink composition of the present invention therefore can improve the fixability of the aluminum powder pigments without affecting the viscosity of the ink, writing characteristics and color of written marks.

From such facts, the aqueous glittering ink composition of the present invention containing the aluminum powder pigments can maintain, to written marks, a glittering feeling stronger than those achieved by the aqueous ink compositions using pigments such as conventional aluminum powder pigments and pearlescent pigments without deteriorating ink characteristics, writing aptitudes or the like since the aluminum powder pigments of the present invention whose particle diameter is large are not oriented by the lubricant of the present invention.

The synthetic resin emulsion of the present invention is not specifically restricted and any water-dispersive synthetic resin emulsion is available. Considering the ink characteristics and writing aptitudes however, it is important to use the ones which do not affect solubility of water-soluble thickening resin, viscosity of the ink, dispersibility of the colorant and color development of the ink. Moreover, it is important not to inhibit the effect on a high glittering feeling by compounding the aluminum powder pigments whose particle diameter is large.

The minimum film forming temperature of the synthetic resin emulsion is preferably not higher than about 20° C. If the minimum film forming temperature of the synthetic resin emulsion is not higher than about 20° C., particularly not higher than 0° C., a film can be formed not only at room temperature (about 25° C.) but in a cold district and fixability of written marks to writing objects can be improved.

Synthetic resin emulsions having an anionic property or a nonionic property can be preferably used. Such synthetic resin emulsions having the anionic property or the nonionic property can be prepared, for example, by producing synthetic resins from anionic or nonionic monomers or using anionic or nonionic emulsifiers. If the synthetic resin emulsion has the anionic property or the nonionic property, stability of the ink composition can be improved.

Preferred synthetic resin emulsions do not affect dispersibility of colorants or solubility of water-soluble thickening resin when pH of inks is about 6 or more.

From such a viewpoint, for example, acryl based synthetic resin emulsions, styrene-acryl based synthetic resin emulsions and vinyl acetate based synthetic resin emulsions can be used as a synthetic resin emulsion. Preferred examples of the acryl based synthetic resins include acrylate copolymer synthetic resin emulsions. Preferred examples of the styrene-acryl based synthetic resin emulsions include styrene-acrylate copolymer synthetic resin emulsions. As the vinyl acetate based synthetic resin emulsions, vinyl acetate synthetic resin emulsions and vinyl acetate-acrylate copolymer synthetic resin emulsions, for example, are preferably used. As the synthetic resin emulsion, one species of these synthetic resins can be used and also two or more species of these synthetic resins can be used in combinations.

For example, the acryl based synthetic resin emulsion can be exemplified by the trade name "Nikasol FX336" (obtained by Nippon Carbide Industries Co., Inc.; minimum film forming temperature <0° C.; pH 7.5; 200 mPa·s), "Nikasol A-02" (obtained by Nippon Carbide Industries Co., Inc.; minimum film forming temperature <0° C.; pH 7.0; 500 mPa·s), and the trade name "Nikasol FH-011A" (obtained by Nippon Carbide Industries Co., Inc.; minimum film forming temperature <0° C.; pH 7.0; 150 mPa·s). The vinyl acetate based synthetic resin emulsion can be exemplified by the trade name "Movinyl 231" (obtained by CLARIANT POLYMERS K.K. minimum film forming temperature <0° C.; pH 4.0; viscosity 500 to 1500 mPa·s). Here, the measured viscosity is the value measured by a B type viscometer at the temperature of 25° C.

Although a content of the synthetic resin emulsion is not particularly specified, a preferable range is 0.1 to 40% by weight in solids with respect to the total amount of the ink composition, for example. The content of the synthetic resin emulsion of less than 0.1% by weight in solids with respect to the total amount of the ink composition results in worsening in fixability of the said aluminum powder pigments whose particle diameter is large to written marks. If the content of the synthetic resin emulsion exceeds 40% by weight in solids with respect to the total amount of the ink composition, the solids are so much that writing characteristics are deteriorated because of, for example, film formation at the pen tip. In addition, written marks are liable to whiten. In order to further improve the fixability of the said aluminum powder pigments whose particle diameter is large to writing objects, the most desirable content of the synthetic resin emulsion is at least about 0.3% by weight in solids with respect to the total amount of the ink composition. Moreover, in order to further improve writing characteristics, the most desirable content of the synthetic resin emulsion is not greater than 20% by weight in solids with respect to the total amount of the ink composition. That is, the optimum content of the synthetic resin emulsion is 0.3 to 20% by weight.

From the above description, as for the aqueous glittering ink composition related to the embodiment of the present invention, the aqueous glittering ink composition containing the following components of a to e with respect to the total amount of the ink composition whose viscosity is about 1,000 to about 10,000 mPa·s (an ELD-type viscometer: 3° R14 cone; rotation speed: 0.5 rpm; 20° C.) is preferable.

a. about 0.01 to about 20% by weight of aluminum powder pigments whose median diameter is not less than about 15 μm coated with oleic acid and/or stearic acid as a lubricant.

b. about 0.1 to about 40% by weight (in solids) of synthetic resin emulsions selected from acryl based synthetic resin emulsions, styrene-acryl based synthetic resin emulsions and vinyl acetate based synthetic resin emulsions c. about 0.01 to about 40% by weight of polysaccharides selected from whelan gum, succinoglycan, and rhamsan gum.

d. about 1 to about 40% by weight of water-soluble organic solvents.

e. about 0.05 to about 15% by weight of colored pigments.

(Other Additives)

Here, as needed, lubricating agent such as polyoxyethylene alkali metal salts, dicarboxylic amides, phosphates and N-oleyl sarcosine salts and the like, rust-inhibitors such as benzotriazole and tolyltriazole dicyclohexyl ammonium nitrate and the like, antiseptic mildew-proofing agents such as benzoisothiazoline-type, pentachlorophenol-type and cresol and the like, and various surfactants for the aluminum powder pigments whose particle diameter is large can be added.

The preferred viscosity range of the ink composition is about 1,000–10,000 mPa·s. The ink composition of the present invention is adjusted to such a viscosity range. These viscosities are measured values by an ELD-type viscometer (3° R14 cone; rotation speed: 0.5 rpm; 20° C.).

(Preparation Method of Ink)

Although the ink can be prepared by the known method comprising dispersing, degassing, filtering, or the like, the following method is preferable to be taken. That is, the aqueous glittering ink is obtained by dispersing water, a water-soluble organic solvent, a glittering aluminum powder pigment and a colorant with a dissolver or the like at a room temperature, thereafter charging a water-soluble resin and a fixing resin, adding each of the additives as required, adjusting the pH of the mixed liquid required, and filtering it by filtration under pressure or the like, and subsequently degassing.

EXAMPLES

Aqueous glittering ink compositions of Examples were obtained following the said preparation method by mixing and stirring ingredients including water, a water-soluble organic solvent, the specific aluminum powder pigments whose particle diameter is large, a colorant, a pigment base and the like in the compositions and compounding amounts (% by weight) given in Table 1 to disperse them, thereafter charging a water-soluble resin and filtering the resulting mixture, and subsequently degassing. For comparison, aqueous glittering ink compositions of Comparative Examples were prepared by mixing and stirring ingredients including water, a water-soluble organic solvent, the aluminum powder pigments with a small particle diameter and the like to disperse them, thereafter charging a water-soluble resin and filtering the resulting mixture, and subsequently degassing. In every preparation, heretofore known dispersing, degassing, filtering techniques and the like were used.

TABLE 1

(% b weight)

| | | Example 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Aluminum powder pigment | I | 4.0 | | | 4.0 | | | 4.0 | | | | | | 4.0 | | |
| | II | | 4.0 | | | 40 | | | 4.0 | | | | | | 4.0 | |
| | III | | | 4.0 | | | 4.0 | | | 4.0 | | | | | | 4.0 |
| | IV | | | | | | | | | | | | | | | |
| | V | | | | | | | | | | 4.0 | 4.0 | 4.0 | | | |
| Pearlescent pigment | | | | | | | | | | | | | | | | |
| Water-soluble resin | I | 0.3 | 0.3 | 0.3 | | | | | | | 0.3 | | | 0.4 | 0.4 | 0.4 |
| | II | | | | 0.4 | 0.4 | 0.4 | | | | | 0.4 | | | | |
| | III | | | | | | | 0.3 | 0.3 | 0.3 | | | 0.3 | | | |
| | IV | | | | | | | | | | 3.0 | 3.0 | 3.0 | | | |
| Fixing resin | I | 15.0 | 15.0 | 15.0 | 15.0 | 15.0 | 15.0 | 15.0 | 15.0 | 15.0 | | | | | | |
| | II | | | | | | | | | | 12.0 | 12.0 | 12.0 | | | |
| Water-soluble organic solvent | I | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| | II | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 |
| Colorant | I | | 2.0 | | 2.0 | | | | | 2.0 | | 2.0 | | | 2.0 | |
| | II | | | 0.8 | | 0.8 | | 0.8 | | | | | 0.8 | | | 0.8 |
| Antiseptic mildew proofing agent | | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| Rust inhibitor | | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Lubricating agent | | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Dispersant of glittering pigment | | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Water | | 56.4 | 54.4 | 55.6 | 54.3 | 55.5 | 56.3 | 55.6 | 56.4 | 54.4 | 56.4 | 54.3 | 55.6 | 71.3 | 69.3 | 70.5 |
| Total | | 100 | 100 | 100 | 100 | 100 | 100 | 100 | 100 | 100 | 100 | 100 | 100 | 100 | 100 | 100 |
| Glittering feeling | | ○ | ○ | ○ | ○ | ○ | ○ | ○ | ○ | ○ | ○ | ○ | ○ | ○ | ○ | ○ |

TABLE 2

(% by weight)

| | | Comparative Example 1 | 2 | 3 | 4 | 5 | 6 | 7 | 8 | 9 | 10 | 11 | 12 |
|---|---|---|---|---|---|---|---|---|---|---|---|---|---|
| Aluminum powder pigment | I | | | | | | | | | | | | |
| | II | | | | | | | | | | | | |
| | III | | | | | | | | | | | | |
| | IV | 4.0 | 4.0 | 4.0 | | | | | | | 4.0 | | |
| | V | | | | 8.0 | 8.0 | 8.0 | | | | | 4.0 | |
| Pearlescent pigment | | | | | | | | 8.0 | 8.0 | 8.0 | | | |
| Water-soluble resin | I | 0.3 | | | 0.3 | | | 0.3 | | | 0.4 | 0.4 | 0.5 |
| | II | | 0.4 | | | 0.4 | | | 0.4 | | | | |
| | III | | | 0.3 | | | 0.3 | | | 0.3 | | | |
| | IV | | | | | | | | | 3.0 | | | |
| Fixing resin | I | 15.0 | 15.0 | 15.0 | 15.0 | 15.0 | 15.0 | | | | | | |
| | II | | | | | | | 15.0 | 15.0 | 12.0 | | | |
| Water soluble organic solvent | I | 7.0 | 7.0 | 7.0 | 7.0 | 7.0 | 7.0 | 7.0 | 7.0 | 7.0 | 7.0 | 7.0 | 7.0 |
| | II | 15.0 | 15.0 | 15.0 | 15.0 | 15.0 | 15.0 | 15.0 | 15.0 | 15.0 | 15.0 | 15.0 | 15.0 |
| Colorant | I | | 2.0 | | | 2.0 | | | 2.0 | | | 20 | |
| | II | | | 0.8 | | | 0.8 | | | 0.8 | | | 0.8 |
| Antiseptic mildew proofing agent | | 0.4 | 0.4 | 0.4 | 0.4 | 0.4 | 0.4 | 0.4 | 0.4 | 0.4 | 0.4 | 0.4 | 0.4 |
| Rust inhibitor | | 0.8 | 0.8 | 0.8 | 0.8 | 0.8 | 0.8 | 0.8 | 0.8 | 0.8 | 0.8 | 0.8 | 0.8 |
| Lubricating agent | | 0.1 | 0.1 | 0.1 | 0.1 | 0.1 | 0.1 | 0.1 | 0.1 | 0.1 | 0.1 | 0.1 | 0.1 |

TABLE 2-continued (% by weight)

| | Comparative Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Dipersant of glittering pigment | 1.0 | 1.0 | 1.0 | 1.0 | 1.0 | 1.0 | 1.0 | 1.0 | 1.0 | 1.0 | 1.0 | 1.0 |
| Water | 56.4 | 54.3 | 55.6 | 52.4 | 50.3 | 51.6 | 52.4 | 50.3 | 51.6 | 71.3 | 69.3 | 66.4 |
| Total | 100 | 100 | 100 | 100 | 100 | 100 | 100 | 100 | 100 | 100 | 100 | 100 |
| Glittering feeling | X | X | X | X | X | X | X | X | X | X | X | X |

In Tables, each raw material composition is as follows:

(Aluminum Powder Pigment)

I: Aluminum powder pigment processed with oleic acid, trade name "WXM5422", obtained by TOYO ALUMINIUM K.K., median diameter=19 μm II: Aluminum powder pigment processed with oleic acid, trade name "WXM1440", obtained by TOYO ALUMINIUM K.K., median diameter=30 μm III: Aluminum powder pigment processed with oleic acid, trade name "WXM1415", obtained by TOYO ALUMINIUM K.K., median diameter=51 μm IV: Aluminum powder pigment processed with stearic acid, trade name "WXM0630", obtained by TOYO ALUMINIUM K.K., median diameter=7 μm V: Aluminum powder pigment processed with stearic acid, trade name "1110W", obtained by Showa Aluminum Corporation., median diameter=15 μm (Pearlescent Pigment)

Trade name "Iriodin 302", obtained by Merck Japan LTD., median diameter=about 5 to 20 μm (Water-soluble Resin)

I: Whelan gum: trade name "K1C376", obtained by Sansho Co., Ltd.

II: Succinoglycan: trade name "Reozan", obtained by Sansho Co., Ltd.

III: Rhamsan gum: trade name "K7C233", obtained by Sansho Co., Ltd.

IV: Amine neutralizing type alkyd resin: trade name-"WatersolS-311", obtained by Dainippon Ink and Chemicals Incorporated (Water-Soluble Organic Solvent)

I: Glycerin

II: Propylene glycol (Fixing Resin)

I: Acryl based synthetic resin emulsion (trade name "Nikasol FH-011A", obtained by Nippon Carbide Industries Co., Inc.; minimum film forming temperature <0° C.; pH 7.0; 150 mPa·s, the measured value when measured by a B typed viscometer at the temperature of 25° C.)

II: Acryl based synthetic resin emulsion (trade name "Nikasol FX-336", obtained by Nippon Carbide Industries Co., Inc.; minimum film forming temperature <0° C.; pH 7.5; 200 mPa·s, the measured value when measured by a B typed viscometer at the temperature of 25° C.)

(Colorant)

I: Blue pigment base: A pigment dispersion of a blue pigment base was obtained, in the form of a water dispersion of pigment (average particle diameter=0.08 μm; solid content=10% by weight), by adding and dissolving triethylamine to a mixture obtained by mixing the following blue pigment and the following resin for dispersing pigment in the following proportion, and thereafter conducting dispersion with a ball mill. Here, as a blue pigment, phthalocyanine blue (trade name "Fastgen Blue-TGR", obtained by Dainippon Ink and Chemicals Incorporated) was used. As the resin for dispersing pigment, styrene-acryl copolymer (trade name "JOHNCRYL J683", obtained by Johnson Co., LTD., weight average molecular weight=8000) was used.

Phthalocyanine blue 5 parts by weight

Resin for dispersing pigment 1 part by weight

II: Red dye (C.I. Acid red 289, trade name "Chugai Aminol Pink R" obtained by Chugai Kasei Co., Ltd.,)

(Antiseptic Mildew-Proofing Agent)

1,2-Benzoisothiazolin-3-on (trade name "Proxell GXL", obtained by CLARIANT POLYMERS K.K.)

(Rust-Inhibitor)

Benzotriazole (Lubricating Agent)

POE alkyl ether phosphate (phosphate-type active agent, trade name "Phosphanol PE-510", obtained by Toho Chemical Industry.)

(Glittering Pigment Dispersant Including Aluminum Powder Pigments, and the Like)

POE nonylphenol ether (nonion-typed surfactant, trade name "Emulgen PI-20T", obtained by Kao Corp., HLB: 13.2)

(Preparation of Test Samples)

Next, each of the ink compositions of Examples and Comparative Examples given in Tables was packed into each of the ink containers made of a hollow polypropylene tube equipped with a ball-point pen tip made of stainless steel (ball material: silicon carbide), and ball-point pens for test samples having the ink containers therein were prepared.

(Evaluation Test)

A glittering feeling of each ink composition for Examples and Comparative Examples given in Table 1 was evaluated by writing on commercially available loose-leaf sheets with these ball-point pens.

Evaluation of a glittering feeling was conducted by visual observation of writing conditions. Rating criteria were: ○ or ones having a strong glittering feeling; X for ones having little or no glittering feeling.

From the Table, in Examples 1, 6, 8, 10 and 13 were obtained written marks having a strong glittering feeling suggestive of a jewel, diamond. In Examples 2, 4, 9, 11 and 14 were obtained written marks having a strong glittering feeling suggestive of a jewel, aquamarine. In Example 3, 5, 7, 12, and 15 were obtained written marks having a strong glittering feeling suggestive of a jewel, pearl pink. On the other hand, in Comparative Examples, strongly whitened written marks were obtained and a glittering feeling did not appear. In particular, in the ink compositions of the Examples, written marks can be obtained in which glittering points that glitter strongly are interspersed compared with Comparative Examples 7, 10, 11, and 12, where the fixing resin is contained.

Here, the above described Examples were applied for an ink composition for ball-point pens, however, they are also applicable to other writing instruments, as far as they are glittering ink compositions of the present invention containing aluminum powder pigments whose median diameter is not less than 15 μm that are ground with oleic acid or stearic acid as a lubricant. In addition, they are also applicable to cosmetic related fields for various purposes including make up cosmetics such as facial cosmetics, manicures, pedicures, nail polishers, mascaras, eye liners, eye shadows, lip sticks, foundations, hair cosmetics, or the like, as far as they are glittering ink compositions of the present invention containing aluminum powder pigments whose median diameter is not less than about 15 μm that are ground with oleic acid or stearic acid as a lubricant.

Since this present invention relates to an aqueous glittering ink composition for writing instruments containing at least the aluminum powder pigments whose median diameter ground with oleic acid or stearic acid as a lubricant is not less than about 15 μm, preferably about 30 to about 60 μm, water-soluble resin, water-soluble organic solvent, and water, compared with other aqueous ink compositions using conventional pigments, such unique written marks can be obtained that have a stronger glittering feeling and have never been achieved. Particularly, in the case of the said aqueous glittering ink composition containing a colorant as well as the aluminum powder pigments, a strong glitter can be obtained to the written marks depending on the hue of the colorant.

The present application claims priority of Japanese application No.2000-215930, the disclosures of which are incorporated herein by reference. While a detailed description of the invention has been provided above, the present invention is not limited thereto and various modifications will be apparent to those of skill in the art. The invention is defined by the claims that follow.

What is claimed is:

1. An aqueous glittering ink composition comprising an aluminum powder pigment whose median diameter is about 30 μm or greater compounded with stearic acid, a resin that makes the aluminum powder pigment non-leafing, a water-soluble organic solvent, and water, wherein the viscosity of the ink ranges from about 1,000 to about 10,000 mPa·s measured by an ELD viscometer: 3° R 14 cone, 0.5 rpm, at a temperature of 20° C.

2. An aqueous glittering ink composition as set forth in claim 1, wherein the said aluminum powder pigment is an aluminum powder pigment whose median diameter is from about 30 to about 60 μm.

3. An aqueous glittering ink composition as set forth in claim 1, wherein the said aluminum powder pigment is contained in about 0.01 to about 20% by weight with respect to the total amount of the ink.

4. An aqueous glittering ink composition as set forth in claim 1, wherein a synthetic resin emulsion is contained as a binder component to fix the said aluminum powder pigment to writing objects.

5. An aqueous glittering ink composition as set forth in claim 4, wherein the synthetic emulsion is contained in about 0.1 to about 40% by weight in solids with respect to the total amount of the ink.

6. An aqueous glittering ink composition comprising an aluminum powder pigment whose median diameter is about 30 μm or greater compounded with stearic acid, a resin that makes the aluminum powder pigment non-leafing, a water-soluble organic solvent, and water, wherein the viscosity of the ink ranges from about 1,000 to about 10,000 mPa·s measured by an ELD viscometer: 3° R 14 cone, 0.5 rpm, at a temperature of 20°C. comprising the following components with respect to the total amount of the ink composition,
   a. about 0.01 to about 20% by weight of said aluminum powder pigment;
   b. about 0.1 to about 40% by weight (in solids) of synthetic resin emulsion selected from the group consisting of an acryl-based synthetic resin emulsion, a styrene-acryl-based synthetic resin emulsion and a vinyl acetate based synthetic resin emulsion;
   c. about 0.01 to about 40% by weight of polysaccharides selected from the group consisting of whelan gum, succinoglycan, and rhamsan gum;
   d. about 1 to about 40% by weight of water-soluble organic solvent; and
   e. about 0.05 to about 15% by weight of colored pigment.

7. A ball-point pen filled with an aqueous ink having the composition recited in claim 6.

8. An aqueous glittering ink composition comprising:
   a. an aluminum powder pigment whose median diameter is about 30 μm or greater compounded with stearic acid;
   b. a water-soluble resin that makes the aluminum powder pigment non-leafing;
   c. a synthetic resin emulsion;
   d. a water-soluble organic solvent; and
   e. water,
wherein the viscosity of the ink ranges from about 1,000 to about 10,000 mPa·s measured by an ELD viscometer: 3° R 14 cone, 0.5 rpm, at a temperature of 20°C.

9. An aqueous glittering ink composition comprising an aluminum powder pigment whose median diameter is not less than about 15 μm compounded with oleic acid and stearic acid, a water-soluble resin, a water-soluble organic solvent, and water.

10. An aqueous glittering ink composition as set forth in claim 9, wherein the said aluminum powder pigment is the aluminum powder pigment whose median diameter is from about 30 to about 60 μm.

11. An aqueous glittering ink composition as set forth in claim 9, wherein the said aluminum powder pigment is contained in about 0.01 to about 20% by weight with respect to the total amount of the ink.

12. An aqueous glittering ink composition as set forth in claim 9, wherein a synthetic resin emulsion is contained as a binder component to fix the said aluminum powder pigment to writing objects.

13. An aqueous glittering ink composition as set forth in claim 12, wherein the synthetic emulsion is contained in about 0.1% to about 40% by weight in solids with respect to the total amount of the ink.

14. An aqueous glittering ink composition as set forth in claim 9, wherein the viscosity of the ink ranges from about 1,000 to about 10,000 mPa·s, measured by an ELD viscometer: 3° R 14 cone, 0.5 rpm, at a temperature of 20°C.

comprising the following components with respect to the total amount of the ink composition,
- a. About 0.01 to about 20% by weight of an aluminum powder pigment;
- b. About 0.1 to about 40% by weight (in solids) of a synthetic resin emulsion selected from the group consisting of an acryl-based synthetic resin emulsion, a styrene-acryl-based synthetic resin emulsion and a vinyl acetate-based synthetic resin emulsion;
- c. About 0.1 to about 40% by weight of polysaccharides selected from the group consisting of Whelan gum, succinoglycan, and rhamsan gum;
- d. About 1 to about 40% by weight of water-soluble organic solvent; and
- e. About 0.05 to 15% by weight of colored pigment.

15. A ball-point pen filled with an aqueous ink having the composition recited in claim 9.

16. An aqueous glittering ink composition, comprising an aluminum powder pigment whose median diameter is not less than about 15 μm compounded with stearic acid, a resin-that makes the aluminum powder pigment non-leafing, a water-soluble organic solvent and water, wherein the resin is an alkyd resin or a melamine resin wherein said resin is hydroxided by conducting electrolysis with a basic neutralizer or by introducing hydroxide or ether group.

17. An aqueous glittering ink composition comprising:
- a. an aluminum powder pigment whose median diameter is not less than about 30 μm compounded with stearic acid;
- b. a water-soluble resin that makes the aluminum powder pigment non-leafing in written marks or coated films;
- c. a water-soluble organic solvent; and
- d. water, wherein the viscosity of the ink ranges from about 1,000 to about 10,000 mPa·s measured by an ELD viscometer: 3° R 14 cone, 0.5 rpm, at a temperature of 20°C.

* * * * *